April 8, 1924.
R. H. LUSCOMBE
PYROMETER FOR INTERNAL COMBUSTION ENGINES
Filed Nov. 19, 1921
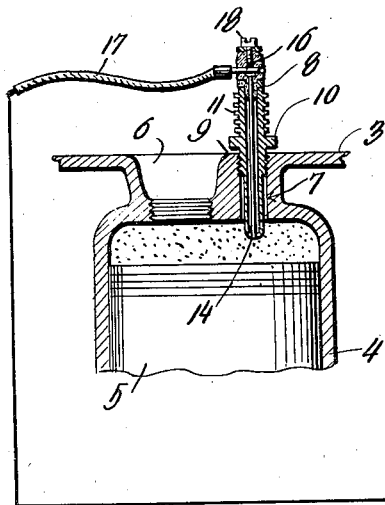
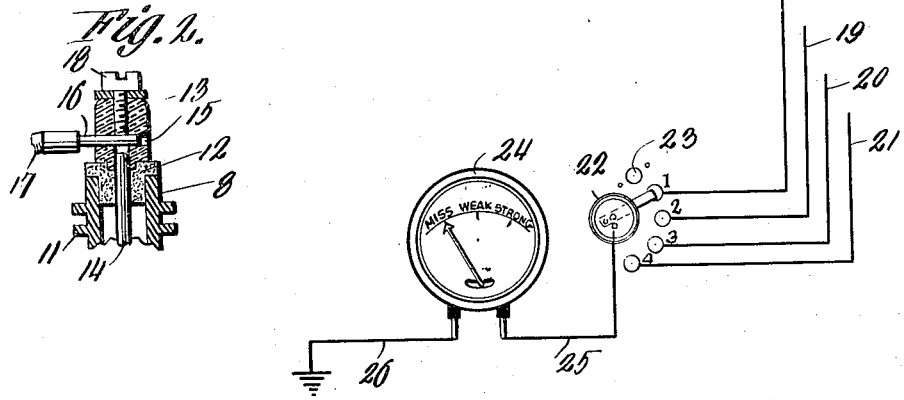
WITNESSES
Inventor
ROBERT H. LUSCOMBE Patented Apr. 8, 1924.

1,489,644

UNITED STATES PATENT OFFICE.

ROBERT H. LUSCOMBE, OF DAVENPORT, IOWA.

PYROMETER FOR INTERNAL-COMBUSTION ENGINES.

Application filed November 19, 1921. Serial No. 516,436.

*To all whom it may concern:*

Be it known that I, ROBERT H. LUSCOMBE, a citizen of the United States, residing at Davenport, in the county of Scott and State of Iowa, have invented certain new and useful Improvements in Pyrometers for Internal-Combustion Engines, of which the following is a specification.

The present invention consists of a pyrometer for internal combustion engines and has for an object the provision of mechanism engageable with the cylinders of an engine to cause the closing of electric circuits due to the heat generated by the products of combustion in the cylinders, each circuit being utilized to actuate an indicator in order to visualize the condition of each cylinder.

The device of this invention is capable of application upon any type of internal combustion engine and the operation thereof is based upon the principle of the thermocouple, or thermoelectric couple. The thermocouples are mounted in the cylinders of the engine so that the hot junctions thereof are exposed to the elements of combustion in the cylinder. The electric current resultant from the heat generated in the cylinder contacting with the hot junction of the thermocouple, is caused to flow through an indicator thereby visualizing the quantity of current in the circuit which quantity is approximately proportionate to the temperature within the cylinder. The temperature average during the cycle of operation of the engine depends upon the operative conditions of the cylinder including the compression and combustion thereof so that if the compression is weak, a low average temperature is indicated whereas if the compression is strong, a high average temperature is indicated.

The above and other objects of this invention will be in part described and in part understood from the following description of the present preferred embodiment of the invention taken in connection with the accompanying drawings wherein:—

Fig. 1 is a diagrammatical view of an apparatus constructed in accordance with this invention showing a portion of an engine in fragmentary section as well as an indicator and switch; and Fig. 2 is a detail fragmentary sectional view of one of the thermocouples illustrating to advantage the manner of connecting one of the circuit lead wires thereto.

In the drawings in order to illustrate the application of this invention, a portion of an internal combustion engine 3 is illustrated which includes a portion of a cylinder 4 and a portion of a piston 5. The cylinder is provided with a spark plug opening 6 and a thermocouple opening 7.

Mounted in the opening 7 of the cylinder is a thermocouple generally designated 8 which consists of a cylindrical body provided with external screw threads 9 which engage corresponding threads in the cylinders. The inner end of the thermocouple body is reduced and extended beyond the inner end of the opening 7 so as to project into the body of the cylinder 4. The upper end of the body of the thermocouple is enlarged to provide a wrench engaging portion 10 immediately above the cylinder, fins 11 being formed on said body above the portion 10. The fins are, of course, used for the purpose of cooling. A fiber washer 12 is mounted on the upper end of the thermocouple body and has superimposed thereon a head 13 made of brass or other suitable material. An electrode 14 is concentrically mounted in the thermocouple body likewise in the fiber washer 12 and has its upper end engaged in the lower end of the head 13. Said head is provided with a transverse opening 15 through which one end 16 of a circuit wire cable 17 is mounted. Said end 16 is held from displacement by a set screw 18 the latter being detachably mounted in the upper end of the head 13 and engaged with said end 16. If desired the electrode 14 may be made of copper or constantin or any other suitable metal and the lower end thereof welded to the lower end of the thermocouple body. The hot junction of the thermocouple is of course at the point where the body is welded to the electrode 14 on the interior of the cylinder so that the heat from the products of combustion will generate electrical potential and cause the current to flow through the wire of the cable 17. A circuit wire such as that carried by the cable 17 is engaged with the thermocouple of each cylinder. Each of these wires is engaged with a contact. For instance, as shown in Fig. 1, the wire 17 is in connection with contact 1, a wire 19 in connection with contact 2, a wire 20 in connection with a contact 3 and a wire 21 in connection with a contact 4. This would indicate that there are four cylinders. These contacts are adapted to be engaged by the contact arm of a switch 22. A neutral contact 23 is provided upon which the contact arm of the switch may be normally engaged. The switch 22 is in circuit with an indicator 24 through the medium of circuit wires 25 and 26. The circuit wire 26 is grounded to the engine. The indicator 24 is equipped with an indicating hand which is operable under influence of the electric current passing through the electric wires into the indicator. The face of the indicator bears indicia which is explanatory of the condition of the cylinder with which the thermocouple is associated. In the present instance the indicator indicia consists of the three words "miss," "weak" and "strong."

In use of this device it will be apparent that the indicator may be mounted upon the instrument board of a motor vehicle or may be used entirely apart from the vehicle if so desired. When the cylinders of the engine are to be tested, the contact arm of the switch may be moved selectively into engagement with the contacts 1, 2, 3 and 4 to thereby successively determine the condition of each cylinder. The engagement of the contact arm of the switch with the contacts 1, 2, 3 and 4 will cause the electric circuits to be closed, in an apparent manner, thereby actuating the indicating hand to show the condition of the cylinder.

I have herein described a preferred embodiment of the invention which is illustrative of the principle. It is apparent that various changes may be made in the mechanical construction within the scope of the claims herewith appended.

What is claimed is:—

1. A pyrometer for internal combustion engines including a thermo-couple adapted to be detachably engaged with an engine cylinder and comprising two elements one of which consists of a body adapted to be mounted in an opening in the cylinder and to extend into the combustion chamber thereof, said element having a longitudinal opening extending therethrough, the other element being positioned in said passage and having one end integrally attached to one end of said body, the other end of said element being insulated from the opposite end of the body, said body being grounded to the cylinder and said element being electrically connected to one terminal of a pyrometer, the other terminal of said pyrometer being grounded.

2. A pyrometer for internal combustion engines including a thermo-couple adapted to be detachably engaged with an engine cylinder and embodying two elements, one of which is concentrically mounted within the other, said elements being welded together at one end and extended into the combustion chamber of the engine, the opposite ends of said elements being spaced and electrically insulated from each other, a conductive head superimposed on the insulated end of the thermo-couple and engaged with one of the thermo-couple elements, one of the ends of said thermo-couples being grounded to the engine, a conductive member detachably engaged with said head, and a pyrometer one terminal of which is grounded and the other terminal engaged with said conductive member.

In testimony whereof I affix my signature in presence of two witnesses.

ROBERT H. LUSCOMBE.

Witnesses:
 W. A. SIEMSEN,
 IRENE FENNERN.